United States Patent

[11] 3,609,614

| [72] | Inventor | Richard Schutz |
| | | Brewster, N.Y. |
| [21] | Appl. No. | 888,647 |
| [22] | Filed | Dec. 29, 1969 |
| [45] | Patented | Sept. 28, 1971 |
| [73] | Assignee | Hipotronics, Inc. |
| | | Brewster, N.Y. |

[54] MECHANICALLY VARIABLE HIGH REACTIVE POWER INDUCTOR FOR TESTING CAPACITIVE LOADS, SUCH AS HIGH VOLTAGE ELECTRICAL POWER TRANSMISSION CABLES
13 Claims, 6 Drawing Figs.

[52] U.S. Cl. ................................................. 336/134, 336/210
[51] Int. Cl. ........................................................ H01f 21/06
[50] Field of Search............................................. 323/45; 336/130, 132, 134, 118, 30, 210

[56] References Cited
UNITED STATES PATENTS

| 2,306,000 | 12/1942 | Stilphen | 336/134 X |
| 2,315,609 | 4/1943 | Fielder | 336/134 X |
| 2,840,789 | 6/1958 | Miller | 336/134 |
| 2,848,699 | 8/1958 | Allison | 336/134 X |
| 3,213,398 | 10/1965 | Marton | 336/118 |
| 3,515,986 | 6/1970 | Peschel | 336/134 X |

*Primary Examiner*—Thomas J. Kozma
*Attorney*—Robertson, Brayn, Parmellee & Johnson ABSTRACT: A mechanically variable high reactive power inductor is described for testing capacitive loads, such as high voltage electrical power transmission cables or large capacitors.

The inductor is formed of upper and lower separable core segments magnetically coupled to electrical windings. The cores are separated in an accurate stable manner to change the inductance of the inductor to tune the inductor into resonance with the capacitance of the load being tested to obtain effectively a series resonance condition therewith. The upper core segment is suspended from lead screws which are jointly operated by a control capable of varying speed to establish accurate gap control for improved high voltage testing capability.

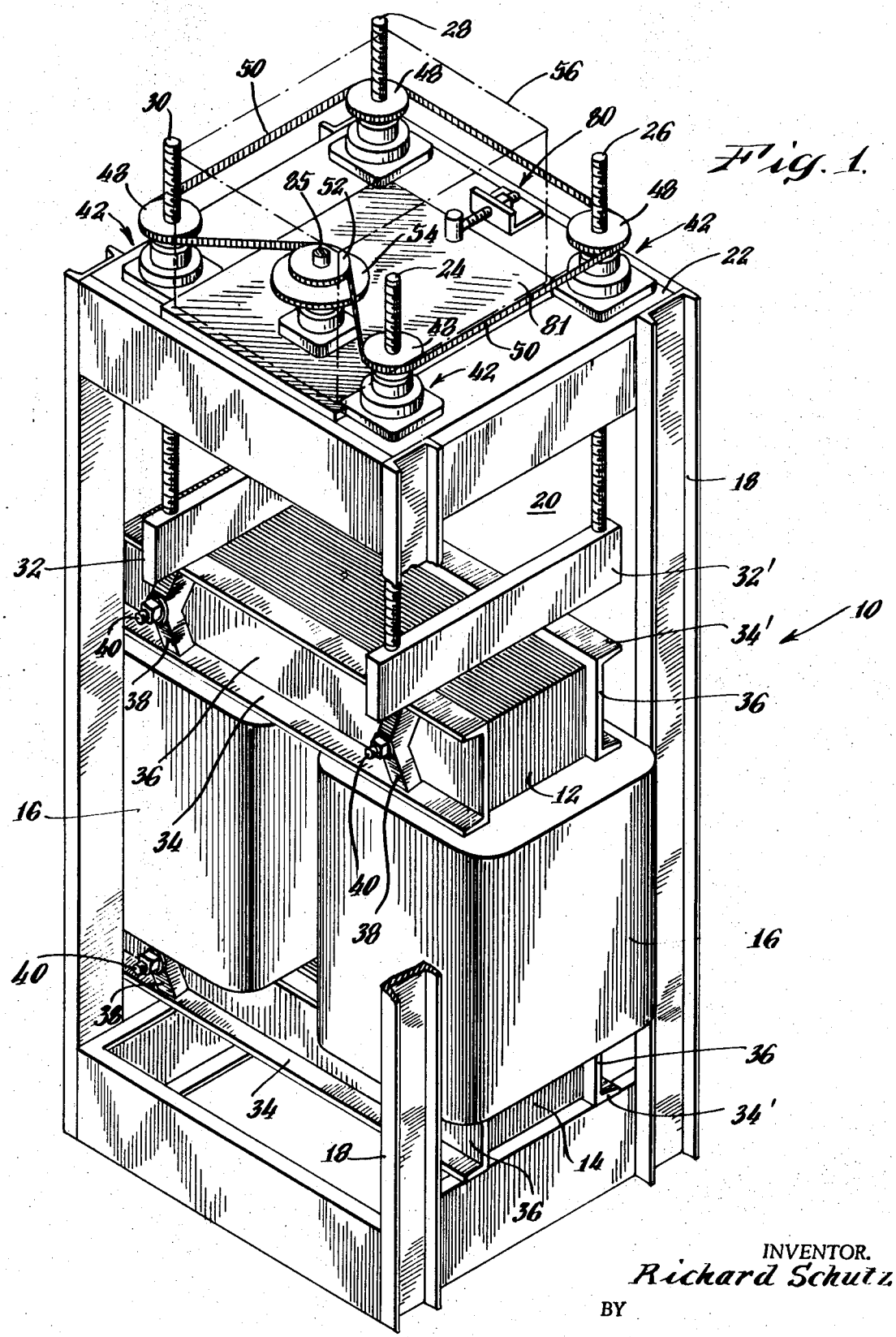

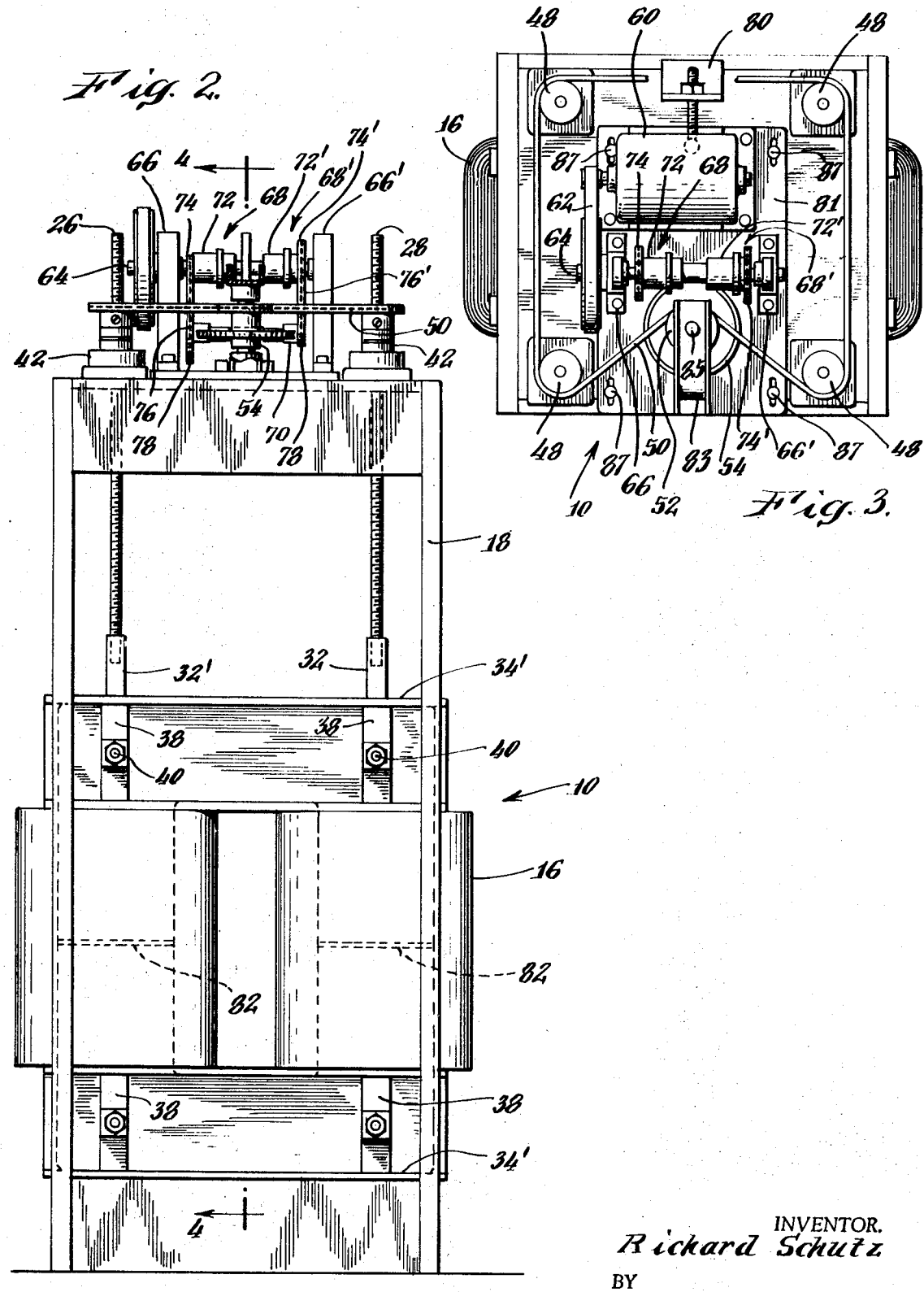

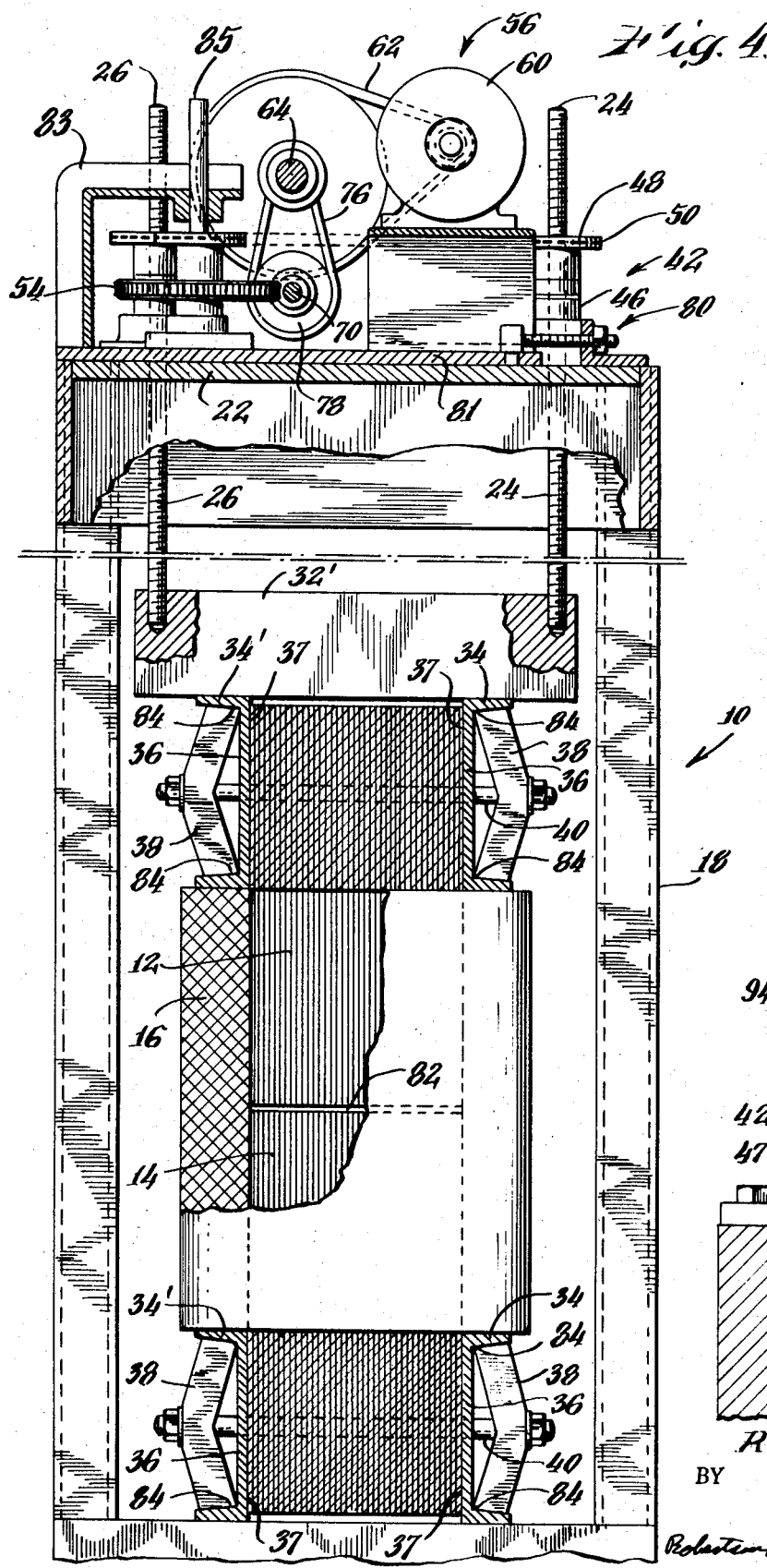

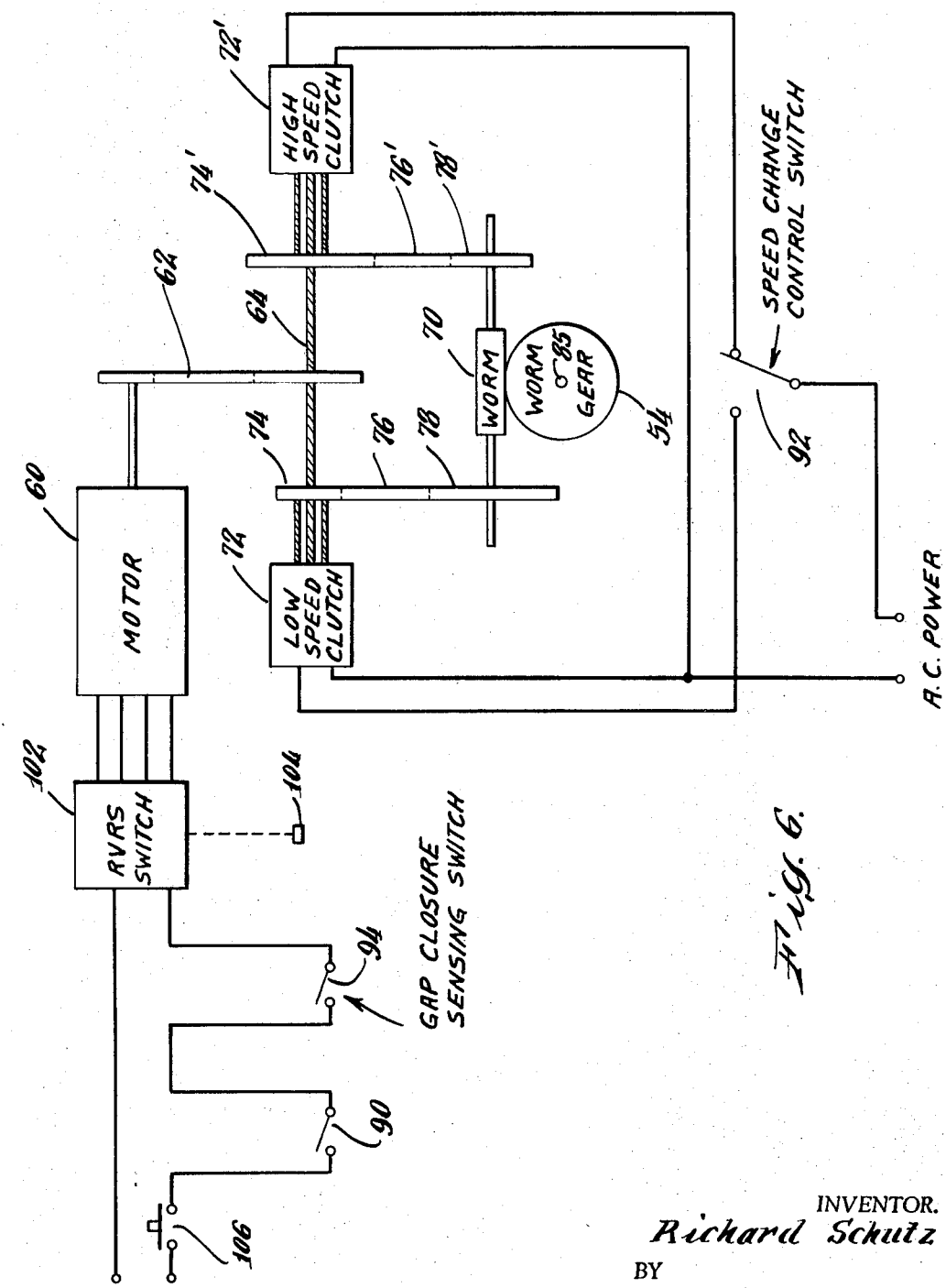

MECHANICALLY VARIABLE HIGH REACTIVE POWER INDUCTOR FOR TESTING CAPACITIVE LOADS, SUCH AS HIGH VOLTAGE ELECTRICAL POWER TRANSMISSION CABLES

This invention relates to an accurately controllable mechanically variable high reactive power inductor for testing capacitive loads, such as high-voltage electrical power transmission cables.

In a copending patent application entitled A METHOD AND APPARATUS FOR SERIES RESONANT CORONA AND DIELECTRIC TESTING OF LONG LENGTHS OF HIGH VOLTAGE ELECTRICAL TRANSMISSION CABLE by Stanley G. Peschel, Ser. No. 730,711 filed on May 21, 1968, now U.S. Pat. No. 3,515,986 and assigned to the same assignee, a method and apparatus is described for testing long lengths of high-voltage electrical high-power transmission cables. This invention describes and is related to an improvement of a high-voltage testing apparatus described in the copending application.

In testing a capacitive load, such as a high-voltage cable, or a large capacitor or assembly of capacitors, with an inductor in accordance with the invention the inductor is connected so that its inductance can be resonated with the capacitance of the load being tested. The inductance is varied until a resonance condition with the capacitance of the load is established. When the resonance condition has been established, the exciting voltage to the circuit is increased to a level where the capacitive load is subjected to the testing voltage. The use of a resonance network for testing capacitive loads such as electrical cable advantageously reduces the magnitude of the exciting voltage; it reduces the kilovolt ampere (KVA) requirements to be drawn from the electrical supply lines, and reduces equipment damages should the test load break down during the test. Cable break down, such as short circuit at an intermediate location detunes the resonance circuit and correspondingly reduces the cable voltage. The inductor of this invention is formed of a large massive core structure split into separable sections to form a mechanically variable gap for varying the inductance.

Although the resonant circuit is a convenient means for producing high voltages, the reactive power capability of the variable inductor are still enormous. The mechanical stresses in the inductor involved at resonance are quite high and tend to adversely affect the mechanical control over the inductance. The attraction forces between the core sections are greatest at small gap widths between core sections, when the change in inductance is more sensitive to gap width variations. Thus, at small gap widths mechanical stresses are likely to adversely affect the high-voltage test.

The illustrative inductor shown has a rating of 3,000 KVA, and the upper core section weights 5,000 pounds. At small gap widths the forces of magnetic attraction between the core sections add up to 18,500 pounds, making a total force of 23,500 pounds to be carried by the lead screws.

In a variable high reactive power inductance device in accordance with the invention for use in the testing of capacitive loads, such as high-voltage electrical power transmission cable, large capacitors or assemblies of capacitors, improved stability is obtained at high-voltage resonance with small gaps between core sections. Improved structural integrity of the core is obtained. Improved operational control of the inductor in accordance with this invention enhances the reliability and accuracy of the high-voltage test equipment with which the inductor is used.

These advantages and others of the invention may be understood from the following description of an inductor in accordance with the invention and which is described in conjunction with the drawings wherein FIG. 1 is a perspective view of a variable inductor in accordance with the invention with several control elements deleted for clarity to illustrate the vertical control of the separable core sections used with the inductor to obtain the inductance variation;

FIG. 2 is a side view in elevation of the variable inductor of FIG. 1;

FIG. 3 is a top plan view of the variable inductor of FIG. 2;

FIG. 4 is a section broken view of the variable inductor of FIG. 1 taken along line 3—3 in FIG. 1;

FIG. 5 is an enlarged view of the sensing elements employed with a lead screw in the control and positioning of a variable inductor in accordance with the invention;

FIG. 6 is an electrical schematic and block diagram of the control used with a variable inductor in accordance with the invention.

With reference to FIG. 1, a variable inductor 10 is shown for testing capacitive loads such as high-voltage transmission cables. The inductor 10 is formed of an upper core segment 12 and a lower core segment 14 which are vertically separable to form a pair of variable gaps. Each core segment is U-shaped and fits within an electrical winding 16. During testing use of inductor 10 the windings 16 are connected so that their inductance can be resonated effectively with a capacitive load to be tested. The windings 16 may be connected in series or in parallel depending upon the conditions desired. Since each winding 16 is magnetically coupled to core segments 12–14, an increase in the separation of the gaps reduces the inductance of the windings 16 and a reduction of the gap between core segments increases their inductance. As mentioned previously, this illustrative inductor has a rating of 3,000 KVA.

As shown in FIG. 1, inductor 10 is of heavy enlarged construction and supported by a rigid steel frame 18. The frame encloses a variable inductance chamber 20. The frame may be submerged in oil or left in open air as desired. The oil, if it is used, serves as a cooling medium in this embodiment and also serves to damp vibrational noise. It is an advantage of this embodiment that it can be used either way. Core segment 14 is supported on the bottom of frame 18. Upper core segment 12 is suspended from the top 22 of frame 18 by means of four lead screws 24, 26, 28 and 30. The lead screws are rigidly affixed to heavy crossmembers 32–32' secured to channel irons 34–34'. Channel irons 34 and 34' are used in pairs to clamp both core segments 12 and 14 between them, with the web portion 36 of each of the channel irons facing toward the core segments. There is an electrical insulating layer 37 (FIG. 4) of fiberboard between the face of the web 36 and the outermost laminations of the core segments 12 and 14. V-shaped clamps 38 are located in the channels with the open end of the V-shaped clamps facing into the channels to operatively contact the flanges of the channels and to contact the web 36 of the channel near the flange at spaced clamp locations. Heavy bolts 40 interconnect oppositely located V-shaped clamps 38 to rigidly and securely clamp the laminations between the channel iron clamps 34 and 34'. The shanks of the bolts 40 are insulated from the laminations by electrical insulating sleeves.

Lead screws 24, 26, 28 and 30 engage low-friction screw feed assemblies 42 (FIG. 5) mounted on the top 22 of frame 18. These screw feed assemblies are each formed of a lead screw meshing, member 44 and are supported by a thrust-bearing member 46 resting on a mount 47 on top 22 of the frame. Lead screw meshing members 44 are further each secured to a sprocket 48 in operative contact with a chain 50 engaging each one of the sprockets on the other lead screws. As shown in FIG. 5, the upper ends of the lead screw meshing members 44 are screwed into the hub of the sprocket 48 and this hub rests upon the thrust bearing 46. The chain 50 further engages a sprocket 52 coaxially mounted with a worm gear 54. A reversible chain drive mechanism 56 is provided for rotation of the worm gear 54 in a manner as will be explained with reference to the other figures.

Rotation of the chain 50 in one direction causes a uniform lifting of the lead screws 24, 26, 28 and 30 and thus an accurate lifting of the upper core segment 12, while rotation of the chain in the opposite direction, causes an accurate lowering of the upper core 12.

With reference to FIGS. 2 and 3 an electric motor 60 is connected with a belt drive 62 to rotate a main shaft 64. Main shaft 64 is suspended above the frame by brackets 66 and 66'. Shaft 64 may provide a mechanical drive through either of two electrically controlled speed adjusting mechanisms 68–68' to drive a worm 70 for driving the worm wheel 54, as will be explained. Worm 70 rotates about a horizontal axis and the worm gear 54 rotates about a vertical axis to rotate sprocket 52 and control the rotation of chain 50.

The rotation of the worm 70 may be produced by either one of the speed adjusting mechanisms 68 and 68' which respectively provide a low and a high drive speed. Each mechanism 68 and 68' includes an electric clutch 72 and 72' coaxially mounted upon the shaft 64 to couple shaft 64 to output sprockets 74 and 74'. Sprockets 74 and 74' are coupled by chains 76 and 76' to sprockets 78 and 78' located at ends of the shaft of the worm 70.

Speed variations depend upon the relative sizes of the sprockets employed with the chain drives, as may be desired by the user of the variable inductor. In this illustrative embodiment, the sprockets 74 and 78' are the same size and likewise the sprockets 74' and 78 are the same size. A chain tension adjustment mechanism 80 is located on top 22 of frame 18 to keep the chain 50 in proper tension for accurate gap control. The chain tension adjustment mechanism 80 serves to move a subplate 81 on which the whole drive assembly 56 is mounted, including the bracket 83 for the worm gear and sprocket shaft 85. After the proper adjustment has been made, the mounting screws 87 are tightened down to hold the subplate 81 in its properly adjusted position.

As may be seen from FIGS. 2 and 4 core segments 12–14 are separable to form variable gaps 82 between the respective pairs of opposed legs of the U-shaped core sections 12 and 14. Since upper core segment 12 is symmetrically suspended from four lead screws 24, 26, 28 and 30 excellent balance is maintained for all gap widths with little gap variations caused by the large mechanical and magnetic forces encountered. Rigidity of the core segments 12 and 14 is further enhanced by the two spaced contacts of the V-shaped clamps 38. Note that each clamp 38 operatively engages the intersection 84 of the flange and web of the channel irons 34 and 34'.

The variation of inductance produced by the separation of the upper core 12 from the lower core 14 is non linear with respect to spacing such that proportionately greater inductance changes occur per unit change in gap spacing when the gap spacing is small. Below a preselected gap size, the low speed mechanism 68 is brought into effect to obtain accurate resonance tuning with the capacitance of the load being tested.

FIG. 5 shows three control switches 90, 92 and 94 operatively associated with a lead screw 24. The switches need not be located adjacent the same lead screw, but for clarity are shown so mounted. Microswitch 90, serves to set the upper limit of spacing of the gaps 82, i.e. the maximum upward travel of the upper core section 12. It is operatively located in axial alignment with lead screw 24. Maximum vertical extension of lead screw 24 produces a contact with switch 90 and produce a signal therefrom for indicating that lead screw 24 (and thus upper core 12) has attained its maximum height, with gaps 82 at a maximum and the inductance of windings 16 at a minimum value.

A speed-change control microswitch 92 is located at a preselected position, with respect to the range of travel of the lead screw 24, which corresponds to a gap size below which the low-speed mechanism 68 goes into effect and above which the high-speed mechanism 68' is utilized. The microswitch 92 is engaged by an enlargement member 96 mounted on lead screw 24. This enlargement 96 has a vertical or axial length "L" indicative of the gap width during which the low speed mechanism 68 is operable. When the upper core segment 12 has been raised to a height so that the bottom 89 of the enlargement member 96 clears microswitch 92, then the high-speed mechanism 68' is brought into effect.

Closure of gaps 82 between the core segments 12–14 is sensed by placing a reverse motion sensing microswitch 94 in operative engagement with the sprocket 48 operatively located above the lead screw meshing member 44 of screw feed assembly 42. Microswitch 94 is operated when the lead screw has been driven all of the way down by the rotating sprocket 48. Upon closure of gap 82 when chain 50 is still moving in the gap-closing direction, the lead screw meshing member rides upwardly along the thread of the lead screw 24 raising slightly away from antifriction element 100 of the thrust bearing 46. This upward motion of the sprocket 48 is sensed by the microswitch 94 which produces a signal for stopping rotation of the chain 50.

FIG. 6 illustrates the electrical control circuit used with variable inductor 10. In FIG. 6, AC power is applied to motor 60 through a reversal switch 102. This reversing switch is controlled by a manual actuator 104. Electrical power is applied through gap closure sensing switch 94 which is normally closed. It is opened when the sprocket 48 (FIG. 5) moves upwardly a slight amount. Motor 60 is operatively connected as shown in FIGS. 1 through 5 to the low- and high-speed clutches 72 and 72' controlled from the speed change control switch 92. Switch 92 is located as shown in the drawing in the high-speed position thus energizing the high-speed clutch to drive the worm gear 54 correspondingly at a higher speed, and vice versa when the switch 92 is in the other position. When the drive 56 has moved the upper core section 12 to the limit of travel in either direction, then the operator actuates the control 104 to reverse the motor 60.

As soon as the desired resonant condition is obtained, the operator releases the on-off switch 106 which is a push button switch, thus accurately holding the inductor in its adjusted position.

What is claimed is:

1. An accurately mechanically variable high reactive power inductor for testing large capacitance loads, such as high-voltage electrical power transmission cables, large capacitors, group of capacitors and the like, comprising a rigid high strength frame defining an inductor space, a high reactive power variable inductor located in the inductor space and formed of a magnetic core and an electrical winding magnetically coupled to the core, said magnetic core being formed of upper and lower separable core segments, the lower core segment being stationary and supported by the bottom of the frame and the upper core segment being vertically movably suspended above the lower core segment from the upper part of the frame, a plurality of nonrotating feed screws supporting the upper core segment and extending vertically upward therefrom, low friction feed members interposed between the respective feed screws and the upper frame part and operatively engaging screw threads on the feed screws to produce vertical movement of said feed screws and upper core segment upon rotation of said feed members to control the gap size between the upper and lower core segments, said feed members being arranged to maintain low friction rotating capability under vertically directed forces produced by the weight of the upper core segment and by electromagnetic forces generated between the upper and lower core segments, drive means operatively coupled to each of said feed members for synchronous rotation thereof to simultaneously control the vertical movement of said feed screws, sensing means for sensing a preselected separation of the upper core segment from the lower core segment, and speed control means responsive to said sensing means for correspondingly altering the effective driving speed of said drive means.

2. The high reactance power accurately variable inductor as claimed in claim 1 wherein said sensing means further includes an enlarged actuator member vertically adjustably mounted on one of said feed screws to move therewith, and a switch mounted to the frame in operative relationship with the path of movement of said enlarged actuator member as said feed screw moves up and down, said speed control means being responsive to said switch.

3. An accurate mechanically variable high reactive power inductor for testing large capacitance loads, such as high-voltage electrical power transmission cables, large capacitors, groups of capacitors, and the like, in a resonance circuit effectively including the capacitance of the load and the inductance of the inductor, comprising a high strength rigid frame, upper and lower magnetic cores mounted in the frame, said cores being separable to form a variable gap, at least one electrical winding magnetically coupled to the cores to provide a variable inductance which is varied by changing the separation between the cores, nonrotating feed screws connected to the upper core and extending upwardly therefrom, low-friction feed members interposed between the feed screws and the upper portion of the frame and operatively engaging the feed screws to produce vertical movement of the feed screws and upper core upon rotation of the feed members to control gap size between the upper and lower cores, channel-iron clamping elements gripping said upper and lower cores, with said channel elements arranged with the web portion adjacent said cores, V-shaped clamps located in the channels with the open end of the V-shaped clamps facing into the channel to operatively contact the flange and the web of said channel at clamping locations, and bolts interconnecting oppositely located V-shaped clamps to rigidly and securely clamp said cores between the channels to form a rigid high-power variable inductor capable of withstanding large magnetic forces with small deformation.

4. The mechanically variable high reactive power inductor as claimed in claim 3 wherein said channel-irons are horizontally disposed with said V-shaped clamps being vertically arranged to contact said flanges near the intersection with the web.

5. In an accurate mechanically variable high reactive power inductor for testing large capacitance loads, such as high-voltage electrical power transmission cables, large capacitors, groups of capacitors, and the like, with an inductor having separable magnetic cores wherein driving means control vertical motion of a movable magnetic core relative to a second magnetic core to form a variable gap for varying the inductance of a winding magnetically coupled to the cores the improvement comprising means for sensing a preselected magnitude of the gap between the first and second cores and speed control means operatively associated with the driving means for reducing the speed of vertical motion of the first core when the size of the variable gap has been reduced to a predetermined size.

6. The mechanically variable inductor as claimed in claim 5 wherein said speed control means further includes a first shaft rotated by the driving means, first and second clutches, said clutches being alternatively operatively actuated by the sensing means with the inputs of the clutches rotationally driven by said first shaft, a common rotating drive member coupled to the movable core for producing motion thereof, first and second speed determining means respectively operatively driven by the first and second clutches for producing a rotation of said common rotating drive member at respectively high and low speeds.

7. The mechanically variable inductor as claimed in claim 6 wherein said first and second clutches are coaxially disposed with said first shaft, with said first and second speed determining means comprising first and second sprocket and chain drives with said sprockets selectively sized to provide the predetermined speed levels.

8. The mechanically variable inductor as claimed in claim 5 and further including means for sensing the closure of the gap between said first and second cores for terminating motion of said movable core by said drive means.

9. An accurate mechanically variable high reactive power inductor for testing large capacitive loads, such as high-voltage electrical transmission cables, large capacitors assemblies of capacitors, and the like, comprising a frame, first and second separable magnetic cores mounted on the frame, at least one electrical winding magnetically coupled to the cores, a plurality of feed screws connected to one of said cores and extending upwardly from said one core to produce a controlled separation of the cores to form a variable gap therebetween for varying the inductance of the winding, a plurality of feed members positioned above said one core and operatively interposed between the respective feed screws and the frame, means for simultaneously driving said feed members to produce motion of the feed screws for controlled variation of the gap between the cores with downward motion of said one core producing closure of said gap and a core gap closure sensor operatively engaged with one of said feed members, said core gap closure sensor controlling said driving means and being operatively located to sense axial motion of its associated feed member in an upward direction away from the core upon closure of the gap for stopping said driving means.

10. An accurately mechanically variable high reactive power inductor for testing capacitive loads comprising a rigid high strength frame defining an inductor space, a high reactive power variable inductor located in the inductor space and formed of a magnetic core and at least one electrical winding magnetically coupled to the core, said magnetic core being formed of upper and lower separable core segments, the lower core segment being stationary and supported by the bottom of the frame and the upper core segment being vertically movably suspended above the lower core segment from the upper part of the frame, a plurality of nonrotating feed screws supporting the upper core segment and extending vertically upward therefrom low friction feed members interposed between respective the feed screws and the upper frame part and operatively engaging screw threads on the feed screws to produce vertical movement of said feed screws and upper core segment upon rotation of said feed members to control the gap spacing between the upper and lower core segments, said feed members being arranged to provide low friction rotating capability under vertically directed forces produced by the weight the upper core segment and by the electromagnetic attraction forces between the upper and lower core segments, drive means operatively coupled to each of said feed members for synchronous rotation thereof to simultaneously control the vertical movement of said feed screws, and speed control means associated with said drive means for slowing the speed of movement of the upper core segment when the spacing between said core segments is reduced below a predetermined level.

11. An accurately mechanically variable high reactive power inductor as claimed in claim 10, in which a gap closure sensor is provided for sensing upward motion of one of said feed members occurring upon closure of the gap between the upper vertically movable core segment and the lower stationary core segment.

12. An accurately mechanically variable high reactive power inductor as claimed in claim 1, in which said sensing means include an enlargement member mounted upon one of said feed screws at a predetermined position and switch means mounted upon said frame at a predetermined position to be actuated by said enlargement member upon occurrence of said preselected separation of said upper core segment from said lower core segment.

13. An accurate mechanically variable high reactive power inductor for testing large capacitance loads, such as high-voltage electrical power transmission cables, large capacitors, groups of capacitors, and the like, in a resonance circuit effectively including the capacitance of the load and the inductance of the inductor, comprising a high strength rigid frame, upper and lower magnetic core segments mounted in the frame, said core segments being U-shaped and being positioned with the ends of their legs in opposed relationship defining a pair of gaps therebetween, said upper core segment being vertically movable to vary the size of said gaps, a pair of electrical windings surrounding the respective legs of said core segments and the variable gaps to provide a variable inductance which is varied by changing said variable gaps, a pair of clamping elements extending along opposite sides of said upper core segment for ripping said upper core segment, a pair of heavy crossmembers extending across said upper core segment and extending outwardly beyond opposite sides thereof, said heavy crossmembers being secured to said clamping elements, a nonrotating feed screw secured to the outer end of each of said crossmembers and extending upwardly therefrom, low-friction feed members interposed between the respective feed screws and the upper portion of the frame and operatively engaging the feed screws to produce vertical movement of the feed screws and the upper core segment upon rotation of the feed members to control the gap size between the legs of the upper and lower core segments, drive means operatively coupled to each of said feed members for producing simultaneous and equal effective rotation thereof, said drive means being changeable in effective driving speed, sensing means mounted upon the upper portion of the frame and responsive to the vertical movement of one of said feed screws, and said sensing means controlling the effective driving speed of said drive means for increasing said effective driving speed when said one feed screw has moved upwardly a predetermined amount corresponding to a preselected size of said gaps.